(12) United States Patent
Whiteaway et al.

(10) Patent No.: US 8,948,609 B2
(45) Date of Patent: Feb. 3, 2015

(54) PRE-DISTORTION TECHNIQUES FOR OPTICAL MODULATORS TO IMPROVE CONSTELLATION POINT SEPARATION

(75) Inventors: James Whiteaway, Hertfordshire (GB); Thomas Duthel, Nuremberg (DE); Jonas Geyer, Nuremberg (DE)

(73) Assignee: Cisco Technology, Inc., San Jose, CA (US)

( * ) Notice: Subject to any disclaimer, the term of this patent is extended or adjusted under 35 U.S.C. 154(b) by 127 days.

(21) Appl. No.: 13/404,471

(22) Filed: Feb. 24, 2012

(65) Prior Publication Data

US 2013/0223849 A1    Aug. 29, 2013

(51) Int. Cl.
H04B 10/12    (2006.01)

(52) U.S. Cl.
USPC ........... 398/193; 398/192; 398/182; 398/188; 398/186

(58) Field of Classification Search
None
See application file for complete search history.

(56) References Cited

U.S. PATENT DOCUMENTS

| 7,653,146 | B2 * | 1/2010 | Kisovec et al. | 375/295 |
|---|---|---|---|---|
| 7,805,082 | B1 * | 9/2010 | Whiteaway | 398/147 |
| 2008/0297270 | A1 | 12/2008 | Takahara et al. | |
| 2009/0324253 | A1 | 12/2009 | Winzer | |
| 2010/0034542 | A1 * | 2/2010 | Armstrong | 398/158 |
| 2010/0150577 | A1 | 6/2010 | Essiambre et al. | |
| 2012/0224849 | A1 * | 9/2012 | Rylyakov et al. | 398/27 |
| 2013/0070785 | A1 * | 3/2013 | Liu et al. | 370/464 |

FOREIGN PATENT DOCUMENTS

| AU | WO2008074085 A1 * | 6/2008 | |
|---|---|---|---|
| WO | WO 2008074085 A1 * | 6/2008 | H04B 10/18 |

OTHER PUBLICATIONS

Barros et al., "Optical Modulator Optimization for Orthogonal Frequency-Division Multiplexing", Journal of Lightwave Technology, vol. 27, No. 13, Jul. 1, 2009, (pp. 2370-2378).
Kim et al., "Chirp Characteristics of Dual-Drive Mach—Zehnder Modulator With a Finite DC Extinction Ratio", IEEE Photonics Technology Letters, vol. 14, No. 3, Mar. 2002, (pp. 298-300).
International Search Report and Written Opinion in counterpart International Application No. PCT/US2013/020029, mailed Apr. 24, 2013.

(Continued)

*Primary Examiner* — Shi K. Li
*Assistant Examiner* — Merlin Brito Peguero
(74) *Attorney, Agent, or Firm* — Edell, Shapiro & Finnan, LLC

(57) ABSTRACT

According to a first aspect, techniques are provided to optimize a Mach-Zehnder modulator drive waveform by distorting the outer modulation levels of the waveform, thereby equalizing eye openings of the received optical field, and in particular creating a wider and more defined central eye opening of the received optical field. According to a second aspect, techniques are provided to adjust in-phase (I) modulation levels based on the imperfect performance of a Mach-Zehnder modulator allocated to modulate quadrature-phase (Q) modulation levels, and conversely to adjust the Q modulation levels based on the imperfect performance of an MZ modulator allocated to modulate I modulation levels.

27 Claims, 16 Drawing Sheets

(56) References Cited

OTHER PUBLICATIONS

Seimetz, et al., "Optical Systems With High-Order DPSK and Star QAM Modulation Based on Interferometric Direct Detection," Journal of Lightwave Technology, vol. 25, No. 6, Jun. 2007, pp. 1515-1530.

Kawakami, et al., "Auto bias control technique for optical 16-QAM transmitter with asymmetric bias dithering," Optics Express, vol. 19, No. 26, Dec. 12, 2011, 5 pages.

* cited by examiner

PRE-DISTORTION TECHNIQUES FOR OPTICAL MODULATORS TO IMPROVE CONSTELLATION POINT SEPARATION

TECHNICAL FIELD

The present disclosure relates to optical communication systems.

BACKGROUND

Coherent optical communication systems usually employ digital amplitude and phase modulation to encode the data onto the carrier waveform using a Mach-Zehnder (MZ) modulator. The MZ modulator is intrinsically non-linear. Consequently, a first order distortion is normally applied to remove the basic non-linearity in the modulator transmission response for higher order modulation formats employing more than 2 modulation levels, such as 16 quadrature amplitude modulation (QAM). However, the performance can still be poor as a result of un-equal openings in the multiple level "eye" constellation associated with the received optical field.

Furthermore, the finite extinction ratio (ER) of the MZ modulator, due to an un-equal splitting ratio or un-equal optical losses, leads to modulation of the quadrature tributary, when the intention is only to modulate the in-phase tributary, and vice versa, for higher order modulation formats. In addition, un-equal electro-optic efficiencies for the two arms of the MZ modulator, also lead to modulation of the quadrature tributary, when the intention is only to modulate the in-phase tributary, and vice versa, for all modulation formats.

DESCRIPTION OF EXAMPLE EMBODIMENTS

Overview

According to a first aspect, techniques are provided to optimize a Mach-Zehnder modulator drive waveform by distorting the outer modulation levels of the waveform, thereby equalizing eye openings of the received optical field, and in particular creating a wider and more defined central eye opening of the received optical field. The inner modulation levels can also be distorted (to a lesser degree) in order to minimize the bit error rate (BER) at the receiver or to minimize the required optical signal-to-noise ratio (OSNR) at a certain BER.

According to a second aspect, techniques are provided to adjust in-phase (I) modulation levels based on the performance of an MZ modulator allocated to modulate quadrature-phase (Q) modulation levels, and conversely to adjust the Q modulation levels based on performance of an MZ modulator allocated to modulate I modulation levels, to account for the inter-related behavior of the MZ modulators for the I and Q tributaries in an optical communication system using QAM.

Example Embodiments

Figure 1:
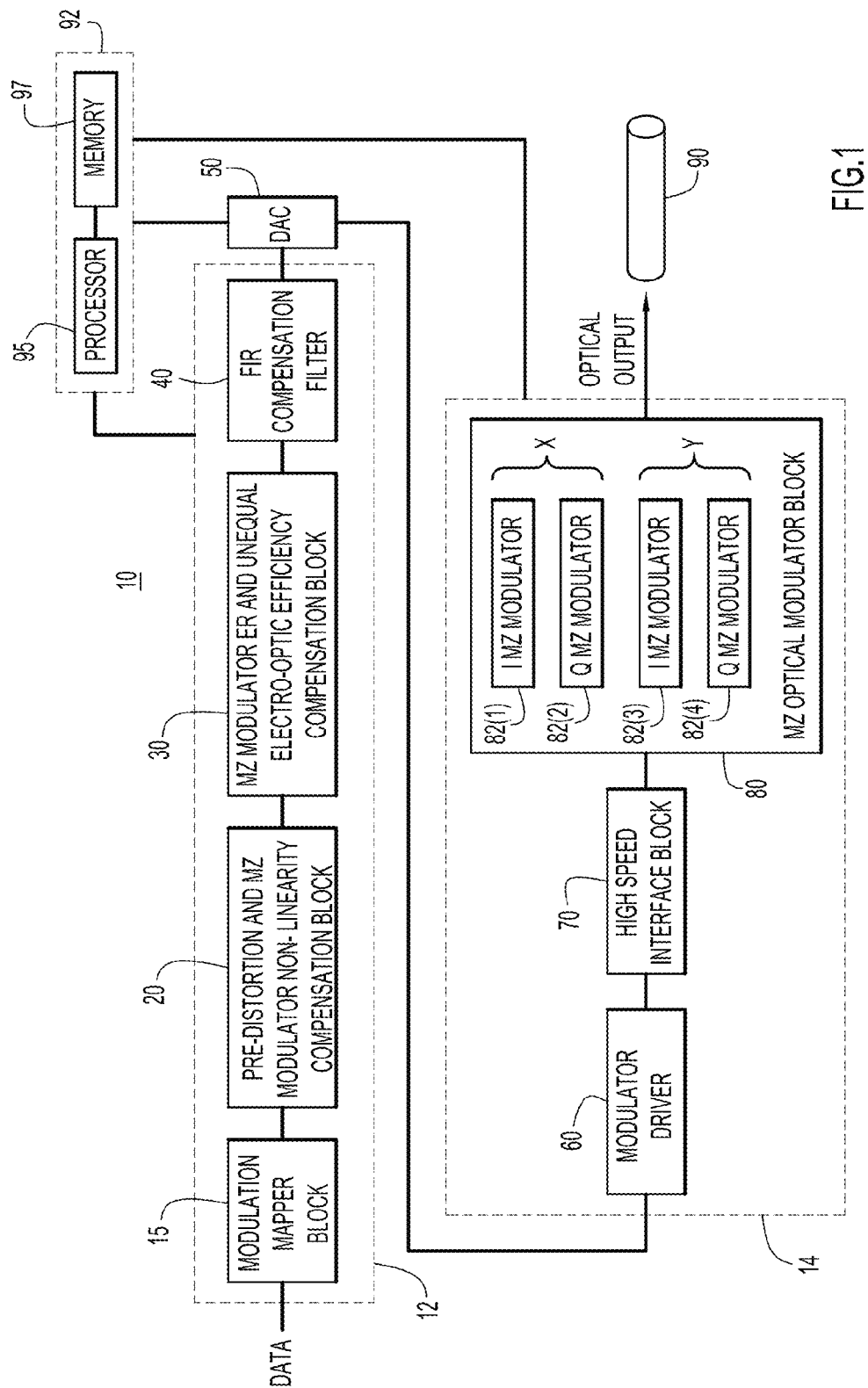
FIG. 1 is a block diagram showing an optical transmitter apparatus configured to perform various modulation compensation operations according to the techniques described herein.

Referring first to FIG. 1, a block diagram is shown of an optical transmitter apparatus 10. The optical transmitter apparatus 10 uses, in particular, Mach-Zehnder (MZ) optical modulators, and certain blocks of the optical transmitter apparatus are provided to impose modulation level distortion to equalise eye openings, as well as to compensate for poor Extinction Ratio (ER) and unequal electro-optic efficiency to improve system performance. The transmitter apparatus 10 includes a digital section 12 and an analog section 14.

The optical transmitter apparatus 10 comprises a modulation mapper block 15, a pre-distortion and MZ modulator non-linearity compensation block 20, a MZ modulator (finite) ER and unequal electro-optic efficiency compensation (circuit) block 30, a finite impulse response filter (FIR) 40 (which is optional), a digital-to-analog converter (DAC) 50, a modulator driver 60, a high speed interface block 70 and a MZ optical modulator block 80. Not all of the functions in these blocks are required in a particular system implementation, and the placement of the high speed interface may come before the modulator driver 60, or it may be required in both positions.

The modulated light output by the MZ optical modulator block 80 is coupled to an optical fiber 90. At the other end of the optical fiber 90 is an optical receiver apparatus (not shown) that receives the optical signals transmitted by the transmitter apparatus 10.

In the example block diagram of FIG. 1, blocks 15, 20, 30 and 40 operate in the digital domain and thus reside in the digital section 12. Each of these blocks may be implemented by one or more integrated circuits comprising digital logic gates configured to perform digital signal processing functions. Alternatively, these blocks may be implemented by software executed by one or more programmable processors (e.g., a microprocessor or microcontroller), which software is stored in memory. For example, a controller 92 is provided that comprises a processor 95 and a memory device 97. The controller 92 is coupled to the digital section 12, the analog section 14 and the DAC 50. The memory 97 may also store values for parameters used in the operation of the blocks 15, 20, 30 and 40, such as look up table values, as described further hereinafter.

It is to be understood that the memory 97 may take on any of a variety of forms. The memory 97 may comprise read only memory (ROM), random access memory (RAM), magnetic disk storage media devices, optical storage media devices, flash memory devices, electrical, optical, or other physical/tangible (non-transitory) memory storage devices. The processor 95 is, for example, a microprocessor or microcontroller that executes instructions stored in the memory to carry out a variety of operations, including control operations of the transmitter 10. In another form, the memory may store instructions that, when executed by the processor 95, cause the processor 95 to perform operations that are performed by any of the blocks 15, 20, 30 and 40. Thus, in general, the memory 97 may comprise one or more tangible (non-transitory) computer readable storage media (e.g., a memory device) encoded with software comprising computer executable instructions and when the software is executed (by the processor 95) it is operable to perform the operations described herein.

Data to be optically transmitted is supplied as input to a modulation mapper block 15. The modulation mapper block 15 is configured to convert the transmit data to sequences of one of four or more levels according to a multilevel QAM scheme. As described further hereinafter, the four or more levels include two outer levels and two or more inner levels. In one example, the modulation mapper block 15 converts input data to be transmitted into 4 data streams, one stream for each of in-phase (I) and quadrature (Q) components/tributaries for each of X and Y orthogonal polarizations. For example, for 16 QAM, there are 4 data streams, denoted XI, XQ, YI and YQ tributaries encoded. The modulation mapper block 15 may support other higher order modulation formats. Additionally the data to be transmitted may be split across more than one optical channel, each of which has 4 tributaries in the case of 16 QAM as noted previously. While 16 QAM is referred to several times herein, this is only by way of example. The techniques described herein are applicable to any 8 QAM or higher modulation scheme.

The pre-distortion and MZ modulator non-linearity compensation block 20 is configured to distort at least the outer two levels of the four or more levels output by the modulation mapper block 15, over and above, and as opposed to, any distortion applied to the inner levels to compensate for the static modulator input-output non-linearity. As explained further hereinafter, the pre-distortion and MZ modulator non-linearity compensation block 20 may also distort the inner levels of the four or more levels output by the modulation mapper block 15 to minimize the bit error rate (BER) at the receiver or to minimize the required optical signal-to-noise ratio (OSNR) for a certain BER. The operations of the pre-distortion and MZ modulator non-linearity compensation block 20 are described below in further detail in connection with FIGS. 2-6.

The analog section 14 comprises the modulator driver 60, high speed interface block 70 and MZ optical modulator block 80. As shown in FIG. 1, the MZ optical modulator block 80 comprises an MZ optical modulator for each of the I and Q modulation streams for each of the X and Y orthogonal polarizations. Thus, in the aforementioned 16 QAM example, there are four data streams that are simultaneously transmitted in the optical fiber, and thus, the MZ optical modulator block 80 comprises four MZ optical modulators: an I MZ modulator 82(1) for the I tributary in the X polarization, a Q MZ modulator 82(2) for the Q tributary in the X polarization, an I MZ modulator 82(3) for the I tributary in the Y polarization, and a Q MZ modulator 82(4) for the Q tributary in the Y polarization.

The MZ modulator finite ER and unequal electro-optic efficiency compensation block 30 performs compensation for finite I and Q MZ modulator ER and for unequal electro-optic efficiencies on the two arms of each MZ modulator. The operations of the MZ modulator finite ER and unequal electro-optic efficiency compensation block 30 are described below in further detail in connection with FIGS. 7-14.

The FIR compensation filter 40 provides compensation for filtering of the DAC 50, modulator driver 60, high speed interface block 70 (such as a cPPI-4 high speed interface), and the electrical response of the MZ modulator block 80. The FIR compensation filter 40 is optional as it may be needed only for certain applications/implementations.

It should be understood that while FIG. 1 shows blocks 20 and 30 as separate blocks, the modulation mapper block 15 may be configured to perform the operations of one or both of blocks 20 and 30.

The DAC 50 converts the digital drive waveforms with pre-distortion for the equalization of the eye openings, and (optionally) finite ER-compensated and unequal electro-optic efficiency-compensated modulation levels, to analog levels (e.g., voltage levels) with a limited resolution, e.g., 6 bits.

The modulator driver 60 is an analog circuit that produces a voltage drive waveform for each of the MZ modulators in the MZ modulator block 80. In the case where the MZ optical modulator block 80 has a modulator for each of the I and Q tributaries, then the modulator driver 60 generates an I drive waveform for the I MZ modulator from I modulation levels (that have been pre-distorted and/or adjusted according to the techniques described herein) and a Q drive waveform for the Q MZ modulator from the Q modulation levels (that have been pre-distorted and/or adjusted according to the techniques described herein).

The high speed interface block 70 includes transmission lines and connectors to interconnect different parts of the transmitter 10, and may include the effects of several interconnections within the analog section 14 of the transmitter 10, and the connection between the DAC block 50 and the modulator driver 60.

The MZ optical modulator block 80 includes a plurality of MZ modulators (as described above) and each MZ modulator that introduces amplitude and phase modulation on an optical output waveform (e.g., infra-red light beam) for each modulation voltage waveform received from the modulator driver 60 (e.g., for each of the 4 data streams XI, XQ, YI, YQ in the case of 16 QAM as described herein). Each MZ modulator also has unwanted parasitic filtering effects that reduce the bandwidth of the output optical signal.

Figure 2:
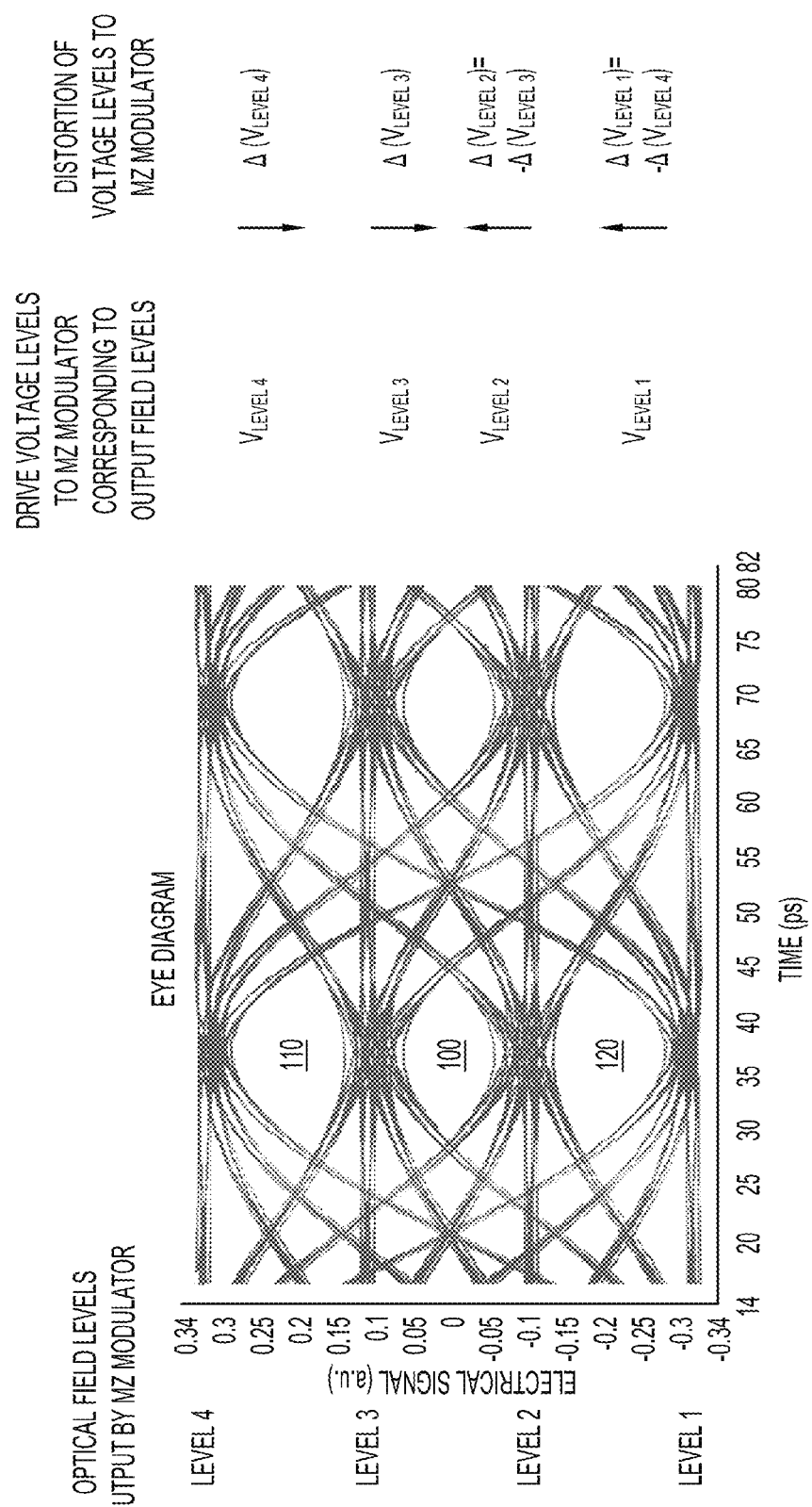
FIG. 2 is a diagram pictorially illustrating, according to a first aspect, how distortion is applied to the outer modulation levels, as well as to the inner modulation levels, in order to improve the central eye opening of the transmitted optical field in one of four tributaries.

Reference is now made to FIG. 2. FIG. 2 shows a multilevel eye diagram obtained from four modulation levels supplied as voltage levels input to an MZ optical modulator. The four drive voltage levels (the four modulation levels) are denoted $V_{Level1}$, $V_{Level2}$, $V_{Level3}$ and $V_{Level4}$. In this example, $V_{Level\ 1}$ and $V_{Level\ 4}$ are the "outer" levels and $V_{Level\ 2}$ and $V_{Level3}$ are the "inner" levels. When voltages at the four levels $V_{Level\ 1}$, $V_{Level\ 2}$, $V_{Level\ 3}$ and $V_{Level\ 4}$ are supplied to an MZ optical modulator, the optical fields produced by the MZ modulator are at a corresponding one of the levels: Level 1, Level 2, Level 3 and Level 4. The conventional normalized ideal voltage drive levels are:

$$-0.5, \frac{+\sin^{-1}\left(\frac{1}{3}\right)}{\pi}, \frac{-\sin^{-1}\left(\frac{1}{3}\right)}{\pi},$$

and 0.5 for $V_{Level\ 1}$, $V_{Level\ 2}$, $V_{Level\ 3}$ and $V_{Level\ 4}$, respectively, if the full voltage range of the modulator is utilized. The outer normalized voltage levels of −0.5 and +0.5 here correspond to voltages that result in minimum and maximum optical field amplitude, respectively.

An MZ optical modulator operates with an intrinsically non-linear transfer function that is sine squared in power, or as a sine wave in field. This is generally compensated for by applying inverse-sine pre-distortion to drive waveform utilizing the full voltage range of the modulator. For higher order modulation formats however, the multiple section eye diagram, for any 1 of 4 tributaries in the transmitter, does not exhibit equal openings. This arises from a combination of the limited electrical bandwidth of the transmitter, and the non-linear transfer function of the MZ modulator. For example, the inner eye opening shown at reference numeral 100 of the 3 section eye diagram obtained from 4 modulation levels is more closed than the 2 outer openings 110 and 120, as shown in FIG. 2.

According to one aspect of the techniques described herein, the outer 2 modulation levels ($V_{Level\ 1}$ and $V_{Level\ 4}$) are distorted to reduce those levels in amplitude (e.g., compress the outer levels) in the case of 4-level or higher modulation, as required in both the I and Q tributaries of a 16 QAM format signal. The distortion is shown for $V_{Level\ 4}$, by the downward/inward pointing arrow labeled $\Delta V_{Level\ 4}$ and by the upward/inward pointing arrow labeled $\Delta V_{Level\ 1}$ which is equal to $-\Delta V_{Level\ 4}$ for $V_{Level\ 1}$. In addition, the inner 2 levels ($V_{Level\ 2}$ and $V_{Level\ 3}$) may also be reduced, but by a much smaller absolute amount as described herein, denoted by the arrows labeled $\Delta V_{Level\ 2}$ and $\Delta V_{Level\ 3}$.

Figure 3:
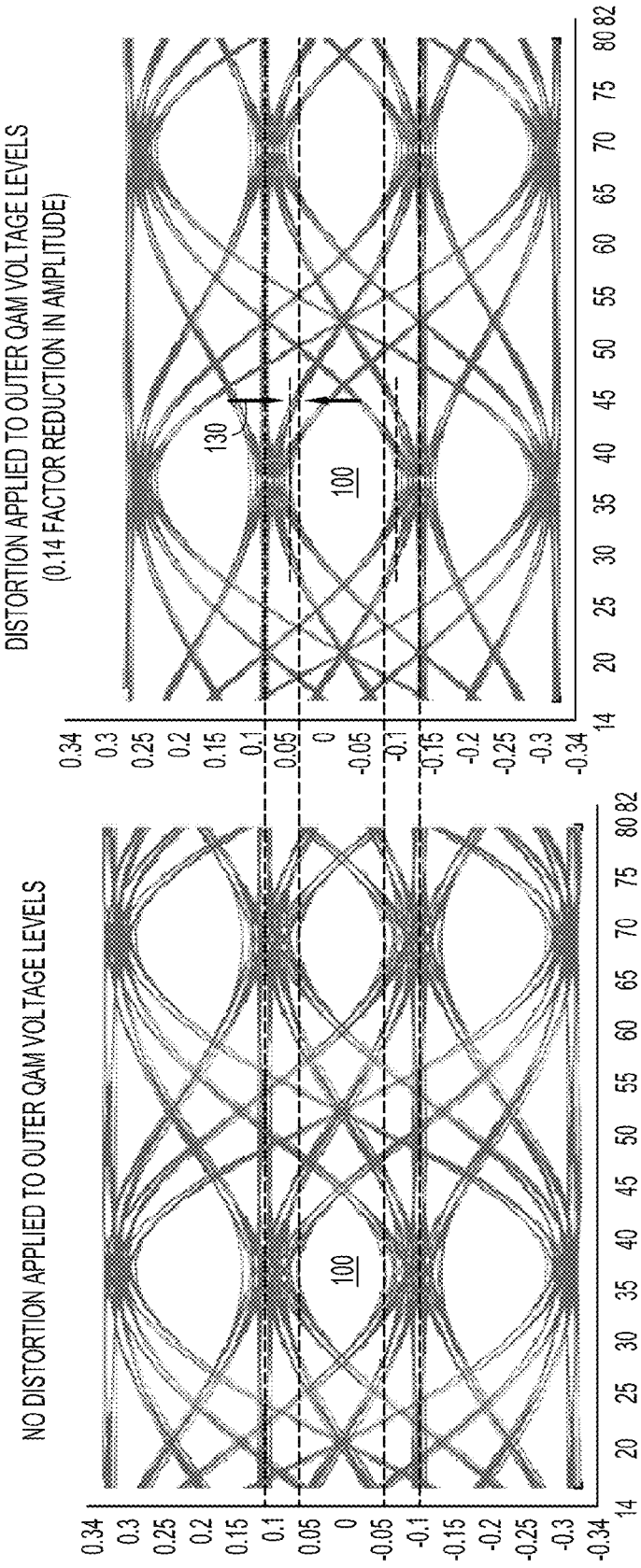
FIG. 3 is a diagram illustrating eye pattern diagrams of one of four tributaries of the transmitter output that depict simulation results for distortion of the outer modulation levels.

As explained further hereinafter, the eye openings of the resulting modulated optical fields are equalized when the outer modulation levels ($V_{Level\ 1}$ and $V_{Level\ 4}$) are compressed, that is, distorted to reduce their amplitudes. In particular, the inner eye opening 100 is enlarged, and consequently, it is much easier for a receiver to accurately distinguish the different optical field levels. The resulting equalization of the eye openings leads to an improvement in the OSNR required for a given BER of several decibels (dBs), for example. The adjustments made to the modulation levels depend on the electrical bandwidth. There is a trade-off in applying this pre-distortion to the outer modulation levels, in that the transmitter output power is reduced with increasing distortion (reduction in amplitude) of the outer modulation levels. However, a 10% reduction in the outer modulation levels may give less than 1 dB reduction in output power, but several dBs of improvement in the OSNR performance FIG. 3 shows a comparison of the inner eye opening 100 without the distortion of the outer modulation levels and with distortion of the outer modulation levels, according to mathematical simulations. The left side of FIG. 3 shows an eye diagram without distortion of the outer modulation levels (the same as the output field levels shown in FIG. 2) and the right side of FIG. 3 shows an eye diagram with distortion of the outer modulation levels ($V_{Level\ 1}$ and $V_{Level\ 4}$). In this example, the outer modulation levels $V_{Level\ 1}$ and $V_{Level\ 4}$ are distorted by 14%, that is, reduced in amplitude by 14% relative to the difference between $V_{Level\ 1}$ and $V_{Level\ 4}$, that is, 14% of the full range between them. As shown at reference numeral 130, the inner eye opening 100 is increased (made wider) when the outer modulation levels are compressed (amplitudes reduced) in this manner (the dashed horizontal lines allowing comparison of the two eye openings are partially obscured by the two plotted eye diagrams as mentioned earlier). This counter-intuitive result, that the inner eye opening is increased, when the outer modulation levels are compressed, results from the interaction of the non-linearity of the MZ modulator with the finite electrical bandwidth of the analog filters. The wider eye opening 100 makes it easier for a receiver to distinguish between output field levels in order to recover the modulation levels of the transmitted signal.

Figure 4:
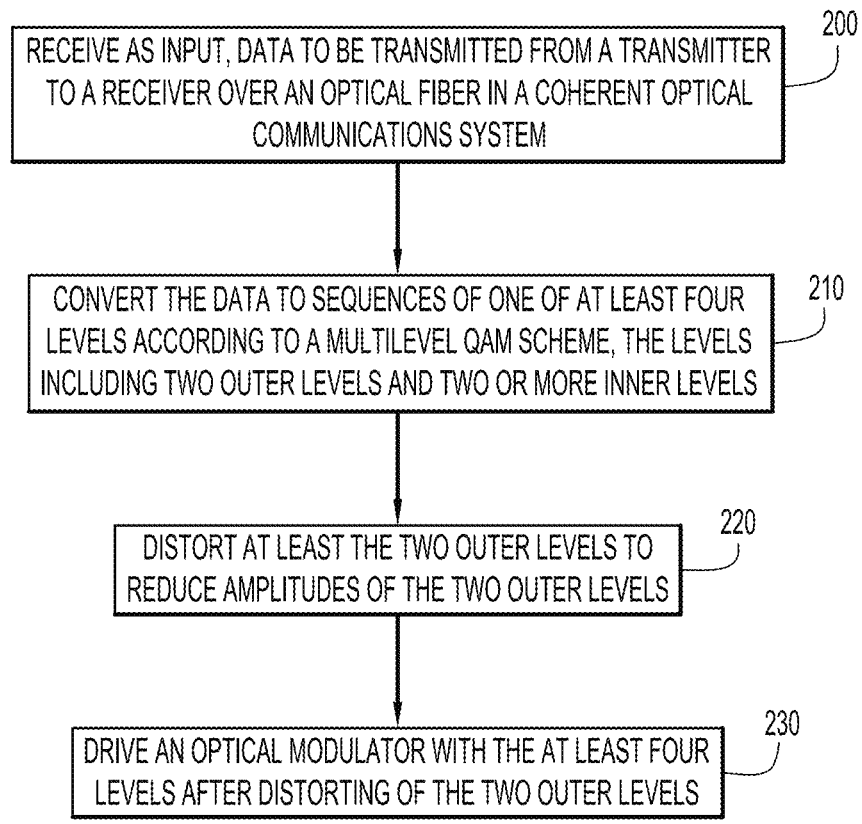
FIG. 4 is a flow chart depicting operations associated with the outer modulation level distortion techniques.

FIG. 4 is a flow chart that depicts the operations performed to distort the outer modulation levels. At 200, data to be transmitted (transmit data) from a transmitter to a receiver over an optical fiber in a coherent optical communications system is received as input. One with ordinary skill in the art would appreciate that the input data will in general be split between the 4 tributaries (2 orthogonal polarizations, each with in-phase and quadrature phase components), and in addition, the input data may be split across different channels at different wavelengths. At 210, the data is converted to sequences of one of at least four levels according to a multi-level QAM scheme. The levels include two outer levels and two or more inner levels. At 220, at least the two outer levels are distorted to reduce the amplitudes of the two outer levels. The distortion applied to the two outer levels may be between approximately 10%-20%, in one example. At 230, an optical modulator is driven with the at least four levels after distortion of the two outer levels. As explained above in connection with FIG. 1, the four or more modulation levels are converted to a voltage drive waveform to drive the optical modulator, e.g., an MZ optical modulator.

In addition to distorting the two outer levels, distortion may be applied to one or more of the inner levels (to a lesser degree than the outer levels) to minimize the BER at the receiver or to reduce the required OSNR for a certain BER. The distortion applied to the one or more inner levels may involve reducing the one or more inner levels by an amount less than the distortion applied to the outer levels.

Figure 5:
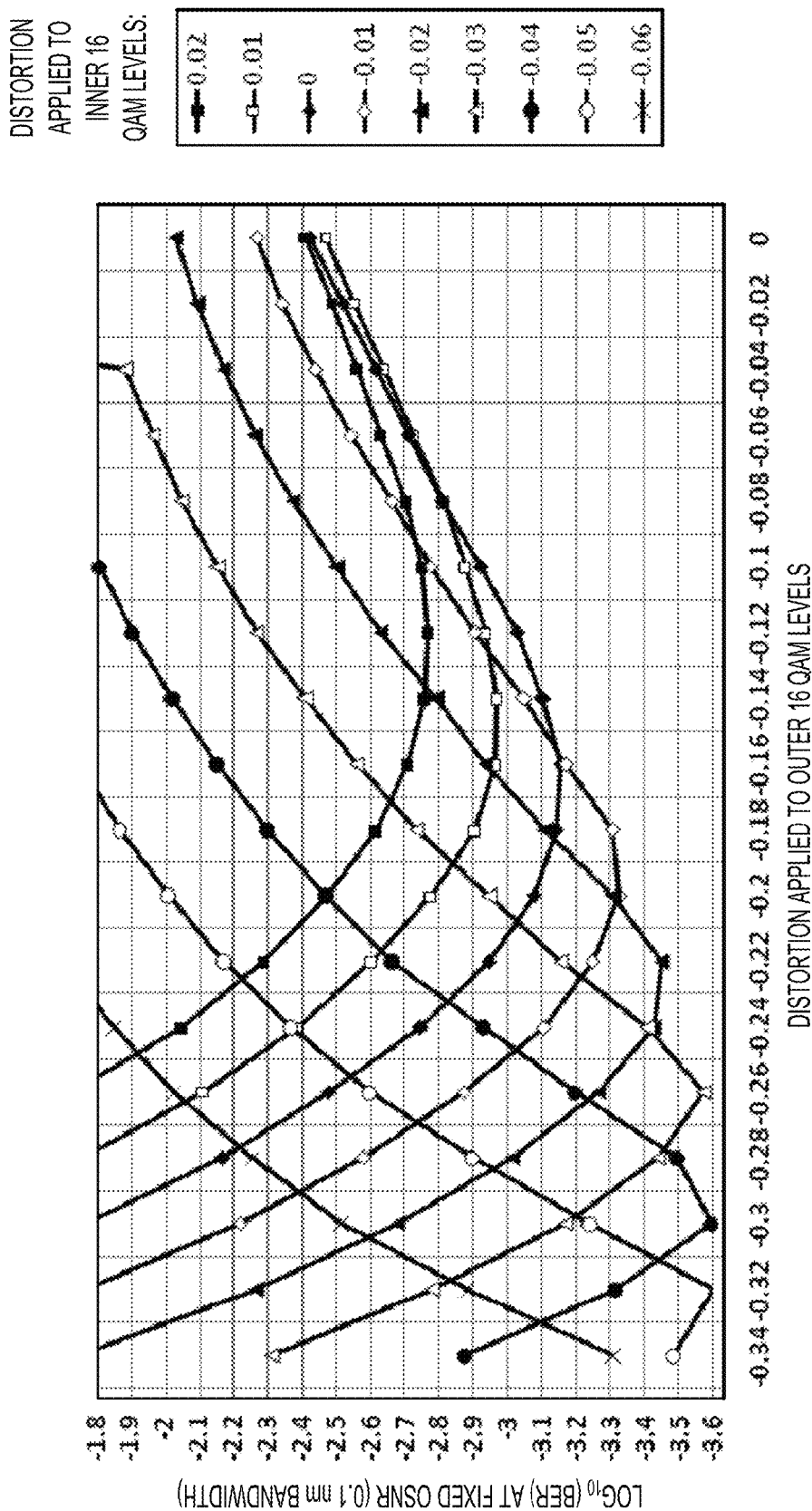
FIG. 5 is a diagram illustrating plots of bit error rate for various distortion amounts applied to outer and inner modulation levels.

Reference is now made to FIG. 5. FIG. 5 contains a series of curves of $\log_{10}(BER)$ at fixed OSNR dB, versus the distortion applied to the outer 16 QAM voltage levels, for varying values of the distortion applied to the inner 16 QAM voltage levels, where BER is the Bit Error Rate. The point with zero outer and inner 16 QAM voltage level distortion on the map refers to inverse-sine distortion to compensate for the MZ modulator non-linearity while maximizing the output power by operating over the full voltage range of the MZ modulator. The best OSNR performance is obtained with stronger compression of the outer levels, and less compression of the inner levels, and generally lies between the condition for no MZ modulator non-linearity compensation and inverse-sine non-linearity compensation. In the limit, this leads to operation with increasing distortion applied to the outer levels to obtain increasingly good performance, while also using increasing small amounts of distortion applied to the inner levels. However the more distortion (amplitude reduction) applied to the outer and inner levels, the lower the output power. Therefore a compromise has to be reached.

A system with only inner level pre-distortion gives very poor OSNR performance. Several main design options present themselves, all involving a reduced output power, and principally reduced outer 16 QAM voltage levels, with smaller reduced inner 16 QAM voltage levels. One option is to distort (reduce) the two outer levels and the two or more inner drive levels such that all of the drive levels are substantially equally spaced from each other, and a second option is to distort (reduce) the two outer levels and the two or more inner levels such that all output optical field levels resulting from driving the optical modulator are substantially equally spaced from each other. However both of these options only give good OSNR performance, when the outer drive levels at least are substantially compressed, from the values corresponding to full utilization of the modulator voltage swing while employing inverse-sine compensation for the static modulator non-linearity. A third option is to compromise between these two approaches or combine them.

Figure 6:
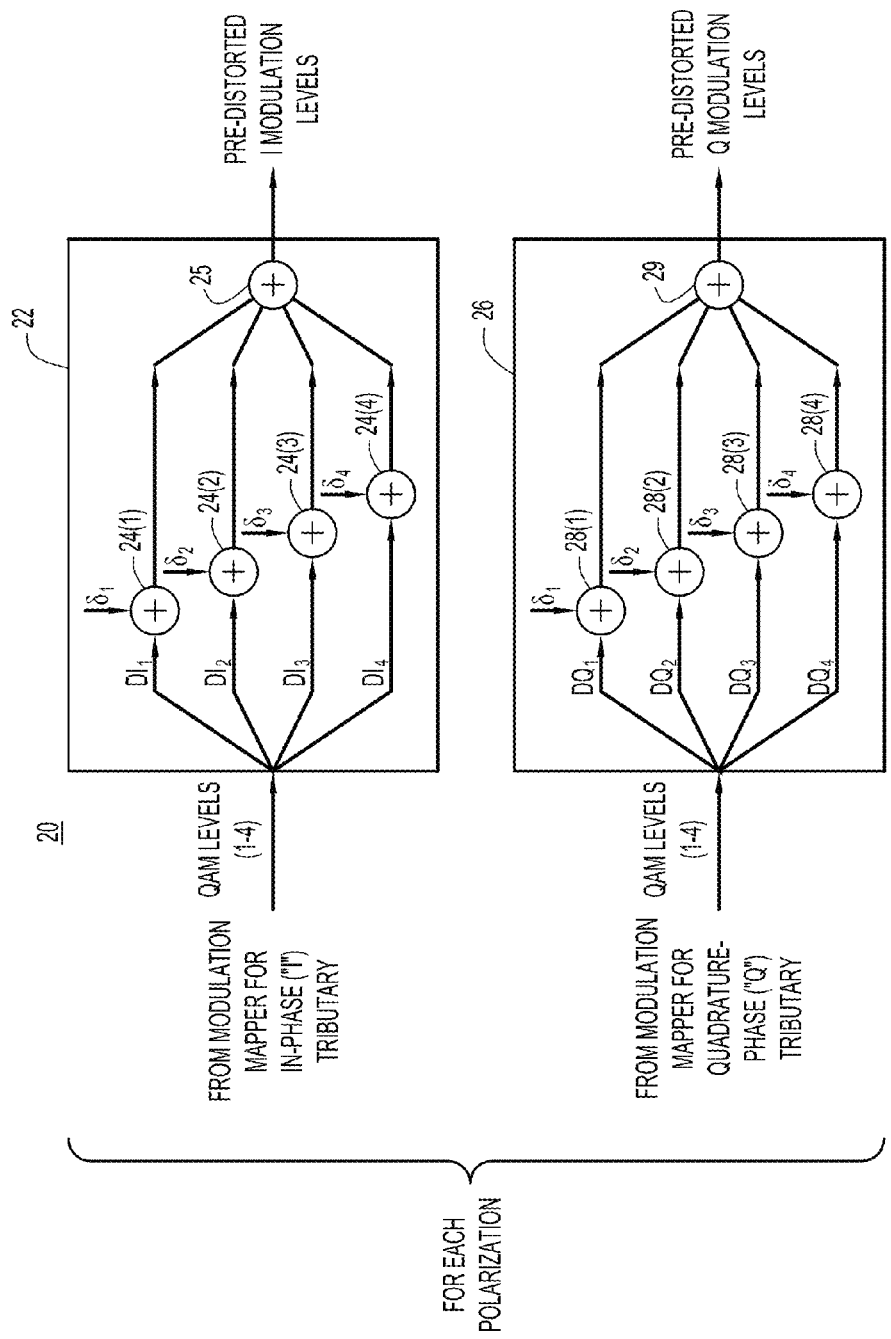
FIG. 6 is a schematic diagram illustrating an example of digital logic circuitry configured to distort the inner and/or outer modulation levels.

FIG. 6 is a schematic diagram that illustrates an example of the pre-distortion and MZ modulator non-linearity compensation block 20. In particular, FIG. 6 shows digital logic circuitry to pre-distort the modulation levels for I and Q tributaries for one polarization. A duplicate of the digital logic circuitry shown in FIG. 6 is used for the I and Q tributaries for the orthogonal polarization. The pre-distortion and MZ modulator non-linearity compensation block 20 comprises digital logic combination circuits 22 and 26. Circuit 22 comprises a plurality of adders 24(1)-24(4) and an adder 25. Similarly, circuit 26 comprises a plurality of adders 28(1)-28(4) and an adder 29.

Circuit 22 receives as input the digital levels output from the modulation mapper block 15 for the I tributary. The digital levels for the I tributary are denoted $DI_1$, $DI_2$, $DI_3$ and $DI_4$, where $DI_1$ and $DI_4$ are the outer levels and $DI_2$ and $DI_3$ are the inner levels. The inputs to adder 24(1) are $DI_1$ and a distortion value $\delta_1$, the inputs to adder 24(2) are $DI_2$ and a distortion value $\delta_2$, the inputs to adder 24(3) are $DI_3$ and a distortion value $\delta_3$, and the inputs to adder 24(4) are $DI_4$ and a distortion value $\delta_4$. The distortion values $\delta_1$ and $\delta_4$ are the distortion values to the outer modulation levels and the distortion values $\delta_2$ and $\delta_3$ are the distortion values to the inner modulation levels. The outputs from the adders 24(1)-24(4) are:

| Output |
| --- |
| $DI_1 + \delta_1$ |
| $DI_2 + \delta_2$ |
| $DI_3 + \delta_3$ |
| $DI_4 + \delta_4$ |

The values for the distortion parameters $\delta_1$-$\delta_4$ may be stored in a look-up table (LUT). Moreover, the operations of the adders 24(1)-24(4) could be implemented as a LUT:

| Input | Output |
| --- | --- |
| $DI_1$ | $DI_1 + \delta_1$ |
| $DI_2$ | $DI_2 + \delta_2$ |
| $DI_3$ | $DI_3 + \delta_3$ |
| $DI_4$ | $DI_4 + \delta_4$ |

If the MZ modulators are biased at the point of zero transmission, then the 4 QAM modulation levels, which are superimposed on the bias voltage, are symmetrically placed about zero volts. In this case, $\delta_4 = -\delta_1$ and $\delta_3 = -\delta_2$.

Thus, to compress the outer levels, negative values are set for $\delta_4$ and positive for $\delta_1$. Similarly, to compress the inner levels, negative values are set for $\delta_3$ and positive for $\delta_2$. In some applications, inverse-dine distortion is used, no distortion of the inner levels is used such that the drive voltage levels are equally spaced, or a mix/combination of the inverse-sine distortion and no distortion is used. The amplitudes of $\delta_1$ and $\delta_4$ may have equal magnitudes but opposite signs, for a modulator biased at zero transmission, and the amplitudes of $\delta_2$ and $\delta_3$ may also have equal magnitudes but opposite signs, but the two sets of magnitudes are not in general equal. Since only one modulation level is active at any instant/sampling interval, the adder 25 passes the distortion-adjusted value of whatever modulation level is active.

The logic circuitry 26 for the Q modulation levels ($DQ_1$, $DQ_2$, $DQ_3$ and $DQ_4$) operates in a similar manner as the logic circuitry 22.

Reference is now made to FIGS. 7-14 for a description of the techniques performed to compensate for the MZ modulator finite ER and unequal electro-optic efficiency, i.e., operations of block 30 in FIG. 1. The finite ER of the I MZ modulator, due to an un-equal splitting ratio or un-equal optical losses, leads to modulation of the Q tributary, when the intention is only to modulate the I tributary, and vice versa, for modulation formats with more than two modulation levels on each tributary. In addition, un-equal electro-optic efficiencies for the two arms of the I MZ modulator also leads to modulation of the Q tributary when the intention is only to modulate the I tributary, and vice versa, for all modulation formats. Another way of viewing this problem is that the MZ modulator chirps in frequency as a result of its non-ideal behavior. Both of these effects occur in all real MZ modulators, and in general every device will exhibit a different mixture of these two effects.

Figure 7:
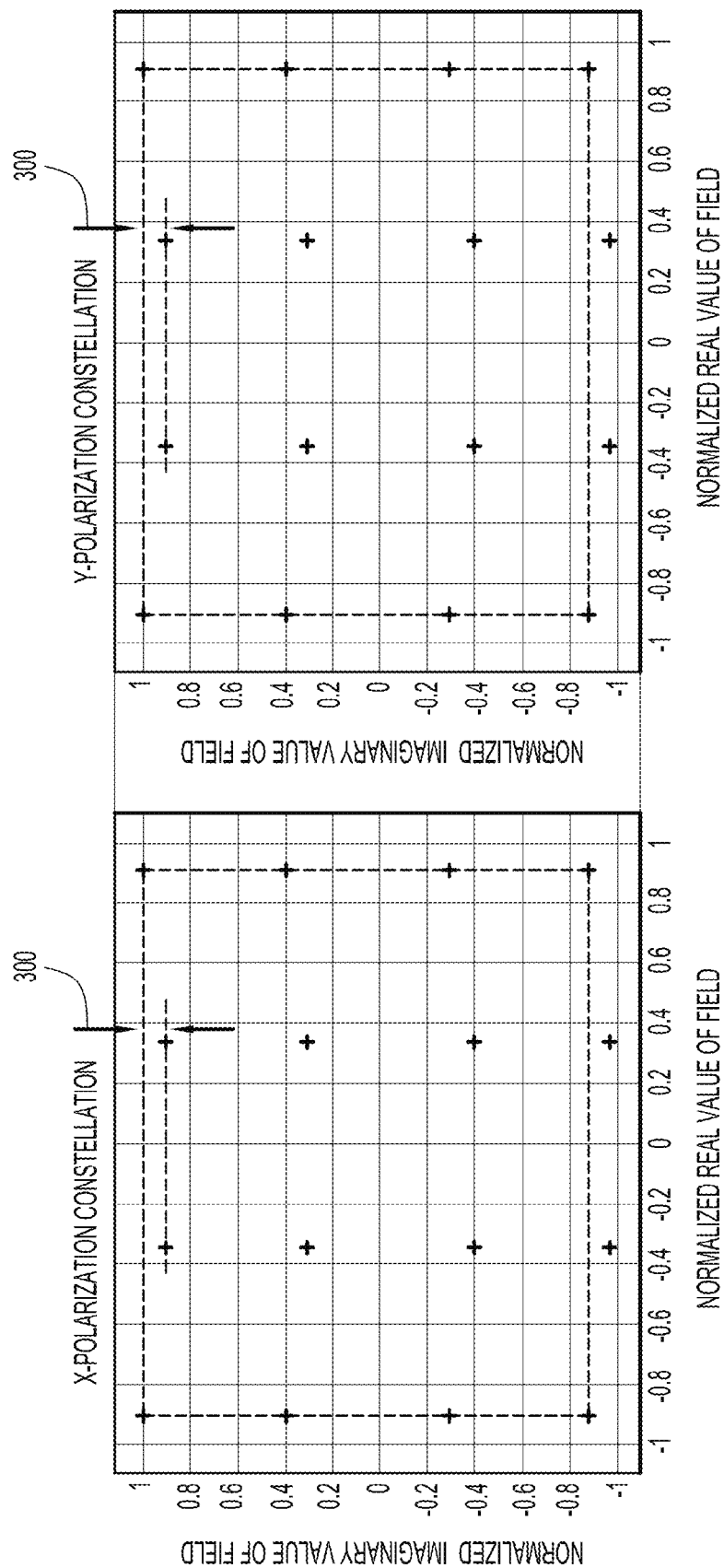
FIGS. 7 and 8 are constellation diagrams that depict the cross-coupling effect between the in-phase tributary and the quadrature tributary in a quadrature amplitude modulation system when the optical modulator for one or both of those tributaries is experiencing poor performance.
Figure 8:
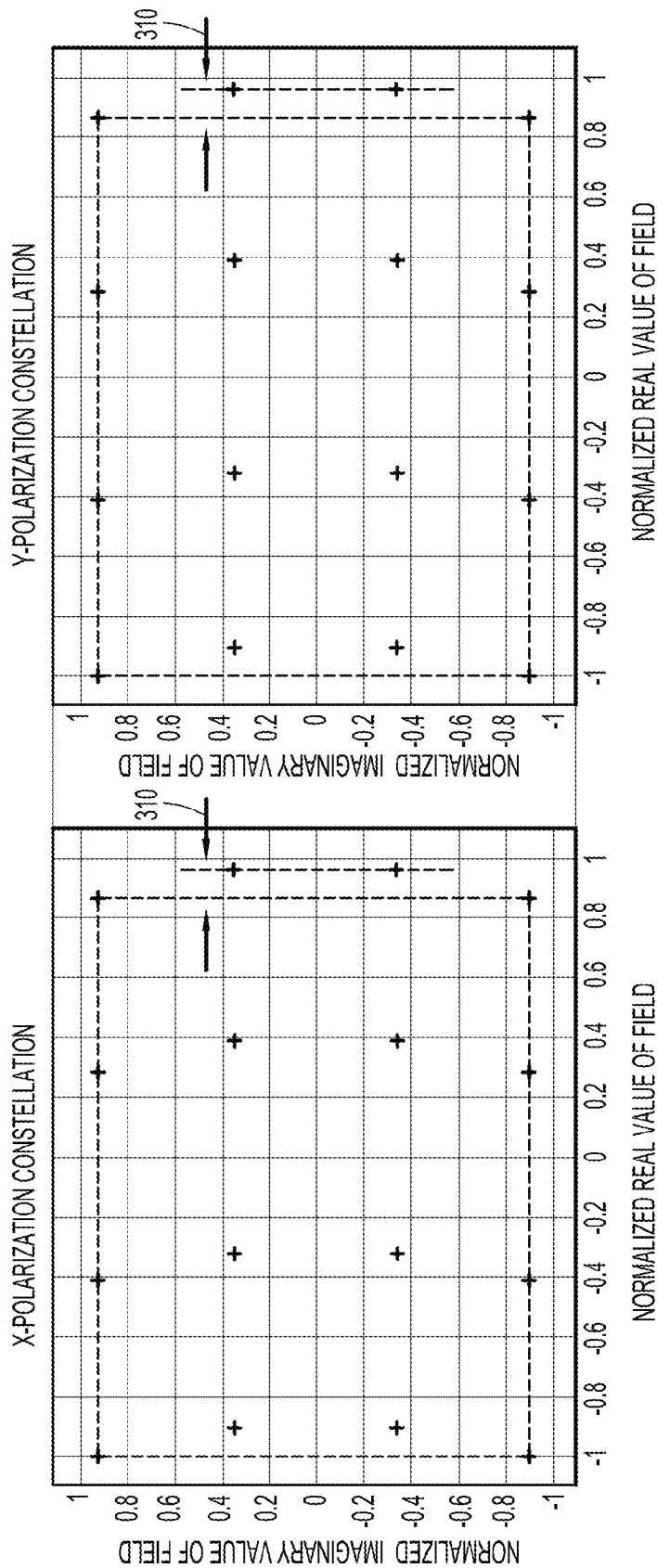

FIG. 7 illustrates the cross-coupling effects from an imperfect I optical modulator into the Q waveform, assuming a perfect Q optical modulator. FIG. 8 illustrates the cross-coupling effects from an imperfect Q optical modulator into the I waveform, assuming a perfect I optical modulator.

FIG. 7 illustrates the constellation diagrams at a receiver for a simulation run for a noise-free transmission, where the ER of the I and Q MZ modulators is 13 and 1000 dB, respectively. Thus, in this example, the I modulator has poor performance and the Q modulator has good performance. The constellation shown on the left side of FIG. 7 is for the X-polarization and the constellation shown on the right side of FIG. 7 is for the Y-polarization. In this example, the distortion applied to the outer QAM levels is −0.20 and the distortion applied to the inner levels is −0.01. As shown at reference numeral 300, the low ER of 13 dB for the I MZ modulator has added a Q component to the constellation points corresponding to the inner I modulation levels. In other words, the non-ideal phase response of the I MZ optical modulator causes undesired distortions in the Q MZ optical modulator output waveform.

FIG. 8 illustrates constellation diagrams for a simulation in which the Q MZ optical modulator is experiencing poor performance. FIG. 8 is similar to FIG. 7 except that the Q MZ optical modulator has an ER of 13 dB and the I MZ optical modulator has an ER of 1000 dB. The same amount of distortion is applied to the inner and outer levels as in FIG. 7. In this case, the low ER for the Q modulator has added an I component to the constellation points corresponding to the inner Q modulation levels. That is, the non-ideal phase response of the Q MZ optical modulator causes undesired distortions in the I MZ optical modulator output waveform.

Figure 9A:
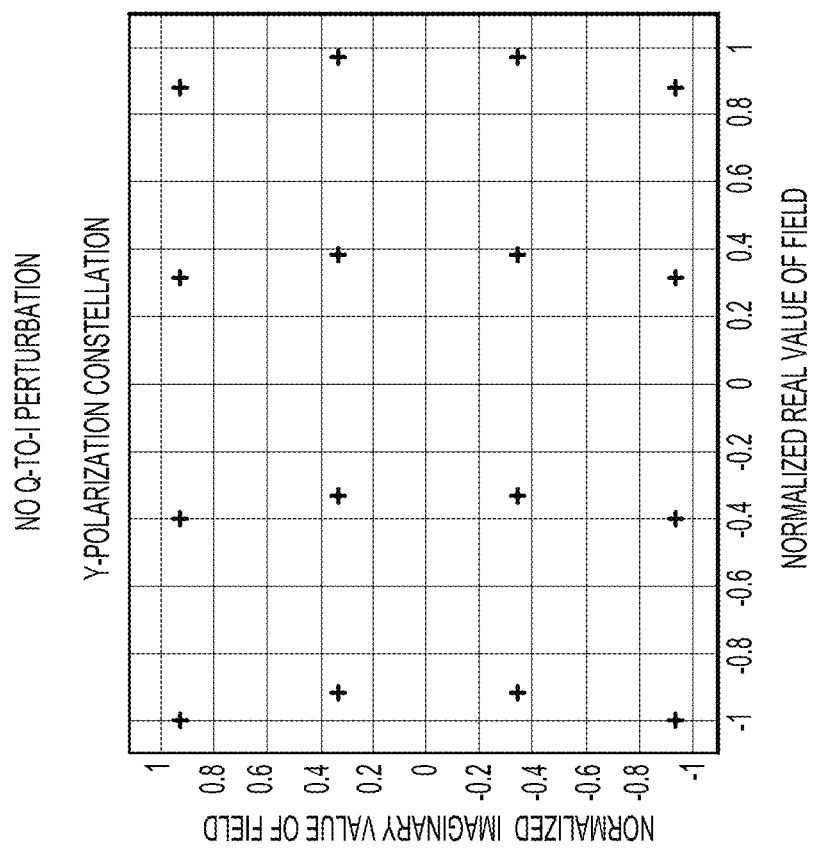
FIGS. 9A, 9B and 10 are constellation diagrams showing the improvements achieved when adjustments are made to the drive waveform for the in-phase tributary to compensate for the poor performance and non-ideal phase response of the optical modulator for the quadrature phase tributary.
Figure 9B:
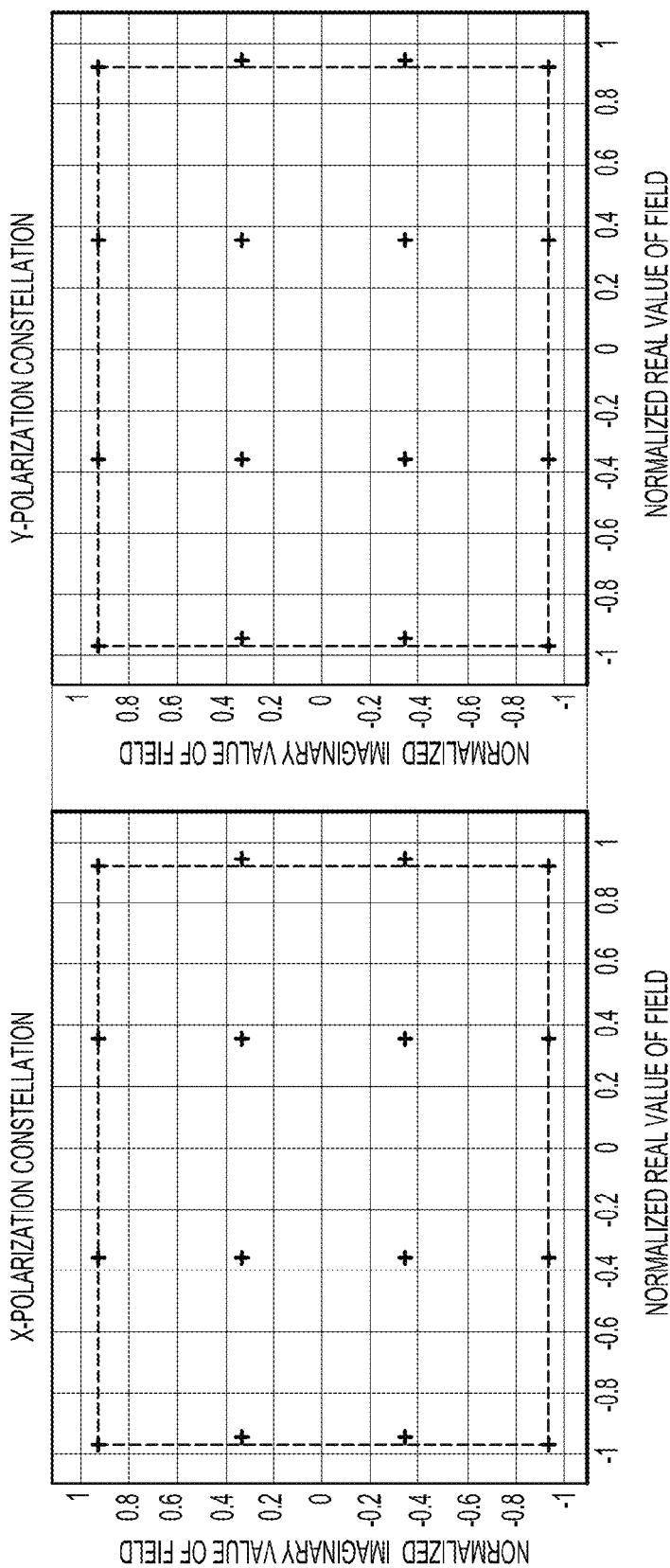

Reference is now made to FIGS. 9A and 9B which show constellation diagrams at a receiver for a simulation in which the ER of the I and Q MZ modulators is 1000 and 13 dB respectively. An adjustment has been made to the I modulator drive waveform, called a 'Q' to 'I', or Q-to-I, voltage modulation level perturbation, to compensate for the non-ideal phase response (and poor ER performance) of the Q MZ optical modulator. The amount of perturbation or adjustment of the I modulation drive waveform in the example of FIG. 9B is −0.03 or a 3% reduction in the amplitude of the modulation levels of the I optical drive waveform. FIG. 9A shows the constellation for the received optical field without the adjustment to the I modulation drive waveform and FIG. 9B shows the constellation for the received optical field with the adjustment to the I modulation drive waveform. As shown by FIGS. 9A and 9B, the use of Q-to-I modulation perturbation significantly reduces the distortion on the constellation when the Q MZ modulator has a low ER, e.g., 13 dB.

Figure 10:
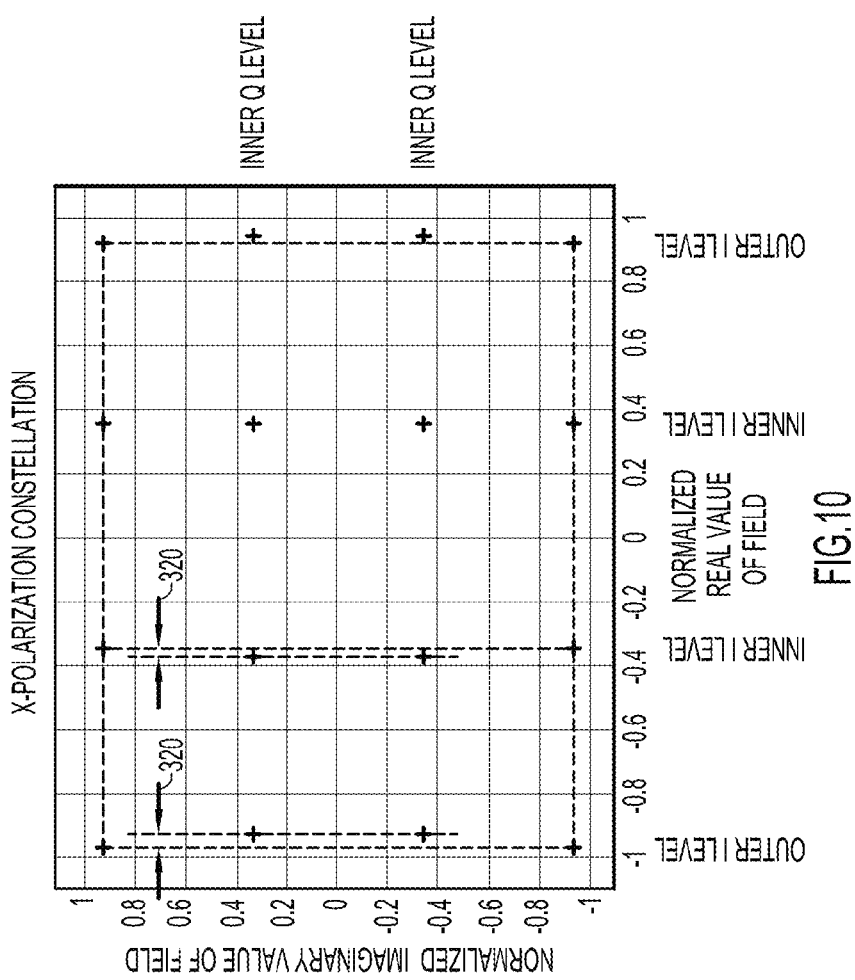

FIG. 10 illustrates a signal constellation for the scenario of FIG. 9B in which Q-to-I modulation perturbation is performed. FIG. 10 shows that the inner 16 QAM levels for the Q tributary have not been adjusted by the same amount for the outer and inner I tributary levels. This is due to the non-linear I MZ modulator response. Based on the observations depicted by FIG. 10, it has been determined that the adjustment to the "other" tributary modulator should be based further on the modulation levels of that "other" modulator itself. In other words, the adjustment made to the Q modulator drive waveform is based firstly on the performance (finite ER and inequality in electro-optic efficiency) of the I MZ optical modulator, and secondly on the modulation levels of the Q MZ optical modulator itself. Furthermore, the adjustment made to the Q modulator drive waveform is based on the performance of the Q MZ optical modulator itself and the adjustment made to the I modulator drive waveform is based on the performance of the I MZ optical modulator itself. Thus, in the most robust form, the adjustment made to the Q modulator drive waveform for driving the Q MZ optical modulator is made based on (a) firstly the performance of the I MZ optical modulator (referred to herein as a "first order" adjustment or correction) to compensate for the non-ideal phase response of the I MZ modulator, (b) secondly the pre-adjusted values of the Q modulation levels (referred to herein as a "second order" adjustment or correction), and (c) thirdly the imperfect performance of the Q MZ optical modulator (referred to herein as a "third order" adjustment or correction); and similarly, the adjustment made to the I modulator drive waveform for driving the I MZ optical modulator is made based on (a) firstly the performance of the Q MZ optical modulator (first order correction) to compensate for the non-ideal phase response of the Q MZ modulator, (b) secondly the pre-adjusted values of the I modulation levels (second order correction), and (c) thirdly the imperfect performance of the I MZ optical modulator (third order correction). The term imperfect performance used in connection with the third order adjustment is meant to refer to unequal splitting and unequal electro-optic efficiency of the MZ modulator.

Figure 11A:
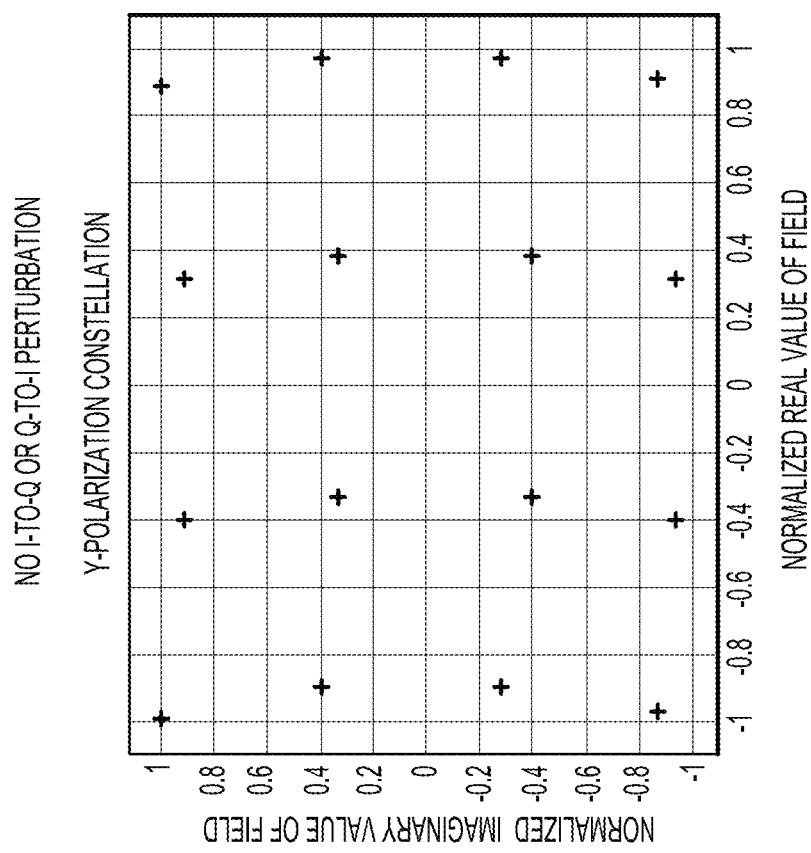
FIGS. 11A and 11B are constellation diagrams depicting improvements achieved when adjustments are made to the drive waveforms for both the in-phase and quadrature tributaries when the optical modulators for both tributaries are experiencing poor performance.
Figure 11B:
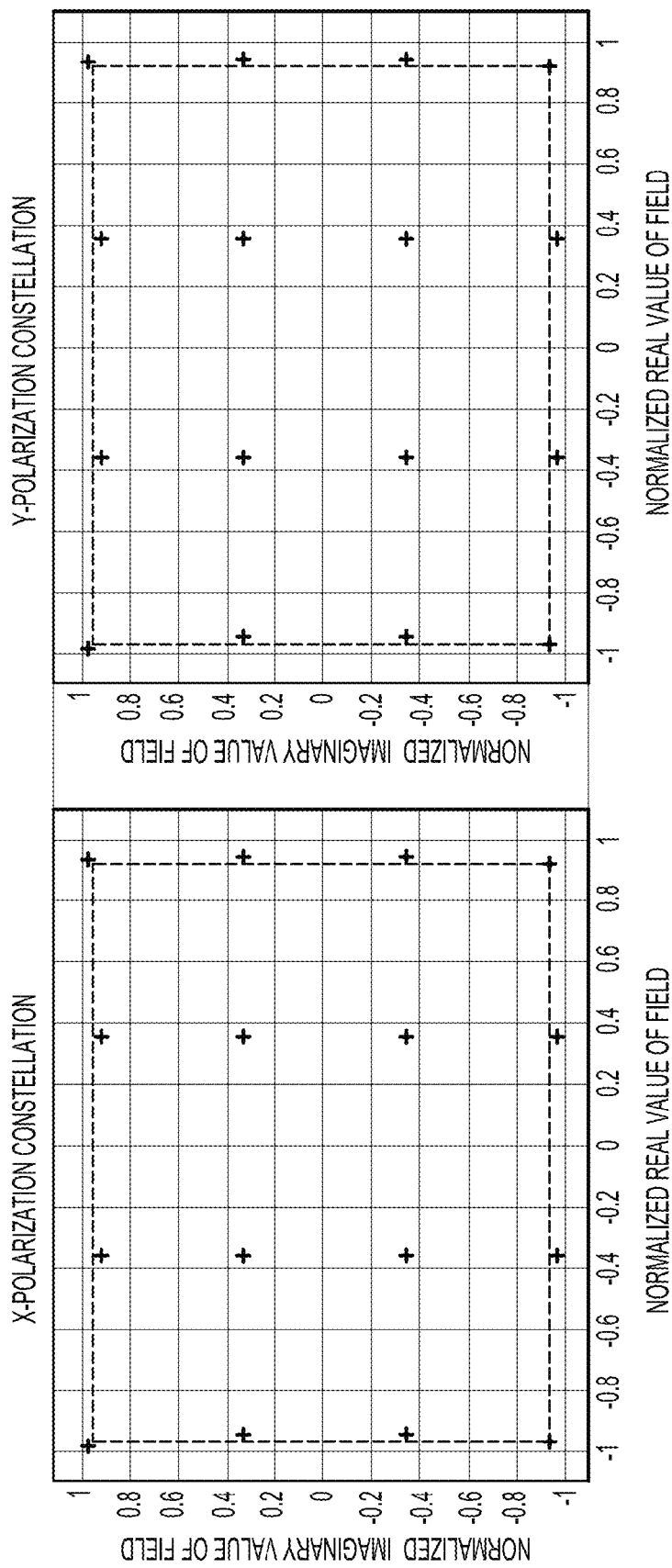

Turning now to FIGS. 11A and 11B, constellations are shown for a situation in which the ER of both the I MZ modulator and Q MZ modulator is poor. For example, the ER of both of the modulators is 13 dB. FIG. 11A shows the constellation if no compensation is made for the poor ER of the I MZ modulator and Q MZ modulator. FIG. 11B shows the constellations when compensation is made in the form of an I-to-Q perturbation of +0.03 and a Q-to-I perturbation of −0.03. The simultaneous use of Q-to-I and I-to-Q modulation perturbation significantly reduces the distortion on the constellations when both the I and Q MZ modulators have a low ER (e.g., 13 dB).

Compensation values may be stored for the first (e.g., I) and second (e.g., Q) optical modulators based on the ER and electro-optic efficiency imbalance determined for the first and second optical modulators, so that the I modulator drive waveform and the Q modulator drive waveform are adjusted based on the stored compensation values. Further still, for first order corrections, adjustment of the Q modulator drive waveform may involve distorting all the levels of the Q modulator drive waveform when the I modulator drive waveform takes on inner levels of the plurality of levels, and similarly adjustment of the I modulator drive waveform may involve distorting all the levels of the I modulator drive waveform when the Q modulator drive waveform takes on inner levels of the plurality of levels.

Figure 12:
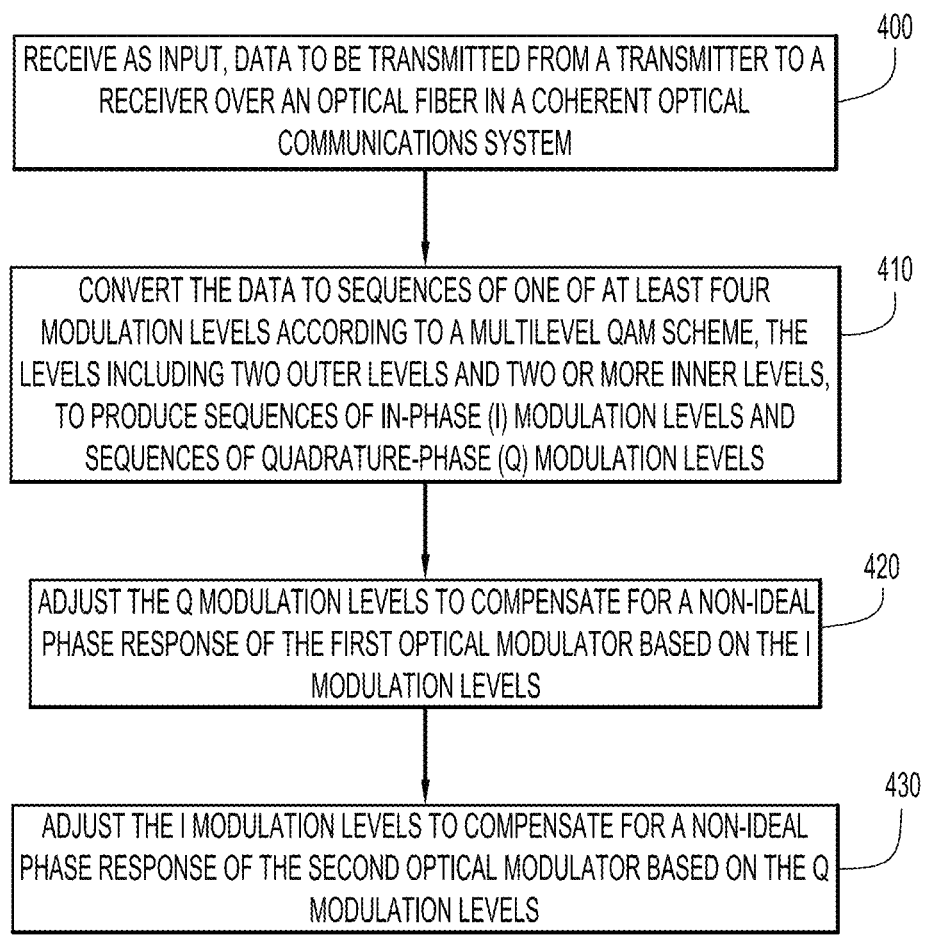
FIG. 12 is a flow chart depicting operations for adjusting modulation levels in the drive waveforms for one or both of the in-phase and quadrature phase tributaries when the optical modulator for one or both of the in-phase and quadrature phase tributaries is experiencing poor performance.

FIG. 12 is a flow chart that depicts the overall finite ER and electro-optic efficiency imbalance compensation operations. In this flow chart and associated description, a first optical modulator is arbitrarily assigned to modulate an I optical field and a second modulator is arbitrarily assigned to modulate a Q optical field. In other words, there is an I MZ optical modulator and a Q MZ optical modulator. At 400, data to be transmitted from a transmitter to a receiver over an optical fiber in a coherent optical communications system is received as input. At 410, the data is converted to sequences of one of at least four levels according to a multilevel QAM scheme, the levels including two outer levels and two or more inner levels, and to produce sequences of I modulation levels and sequences of Q modulation levels. At 420, the Q modulation levels are adjusted to compensate for a non-ideal phase response of the first optical modulator based on the I modulation levels. At 430 the I modulation levels are adjusted to compensate for a non-ideal phase response of the second optical modulator based on the Q modulation levels. The modulator driver 60 generates a Q drive waveform from the adjusted Q modulation levels and an I drive waveform from the adjusted I modulation levels (after the DAC 50).

Second order corrections can be incorporated by adjusting the Q modulation levels to compensate for the non-ideal phase response of the I modulator, while also allowing for the modulation level of the Q modulator, and vice versa. Third order corrections can also be incorporated by adjusting the Q modulation levels for the non-ideal phase response of the I modulator, while also allowing for the modulation level of the Q modulator, and for the imperfect performance of the Q modulator, and vice versa. In fact these corrections applied to the Q modulator will give unwanted phase effects that could be corrected with the I modulator, and an infinite regression of interactions occurs in principle between corrections applied to each modulator, but in practice a very limited number of interactions will be considered.

Figure 13:
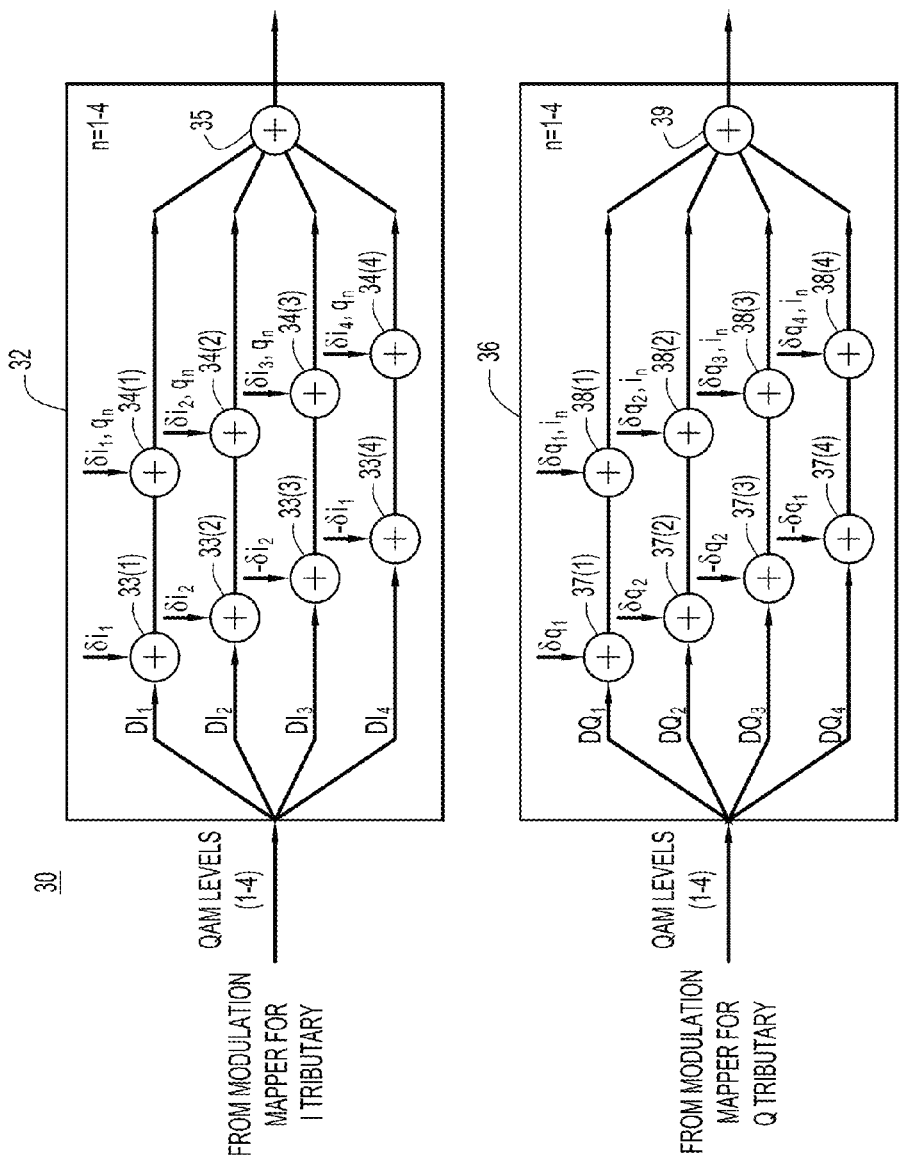
FIGS. 13 and 14 are schematic diagrams of digital logic circuitry configured to adjust modulation levels in the drive waveforms to perform compensation for poor performance of the optical modulators in one or both of the in-phase and quadrature phase tributaries, in addition to the adjustments to equalize the eye diagram openings of the output optical fields.
Figure 14:
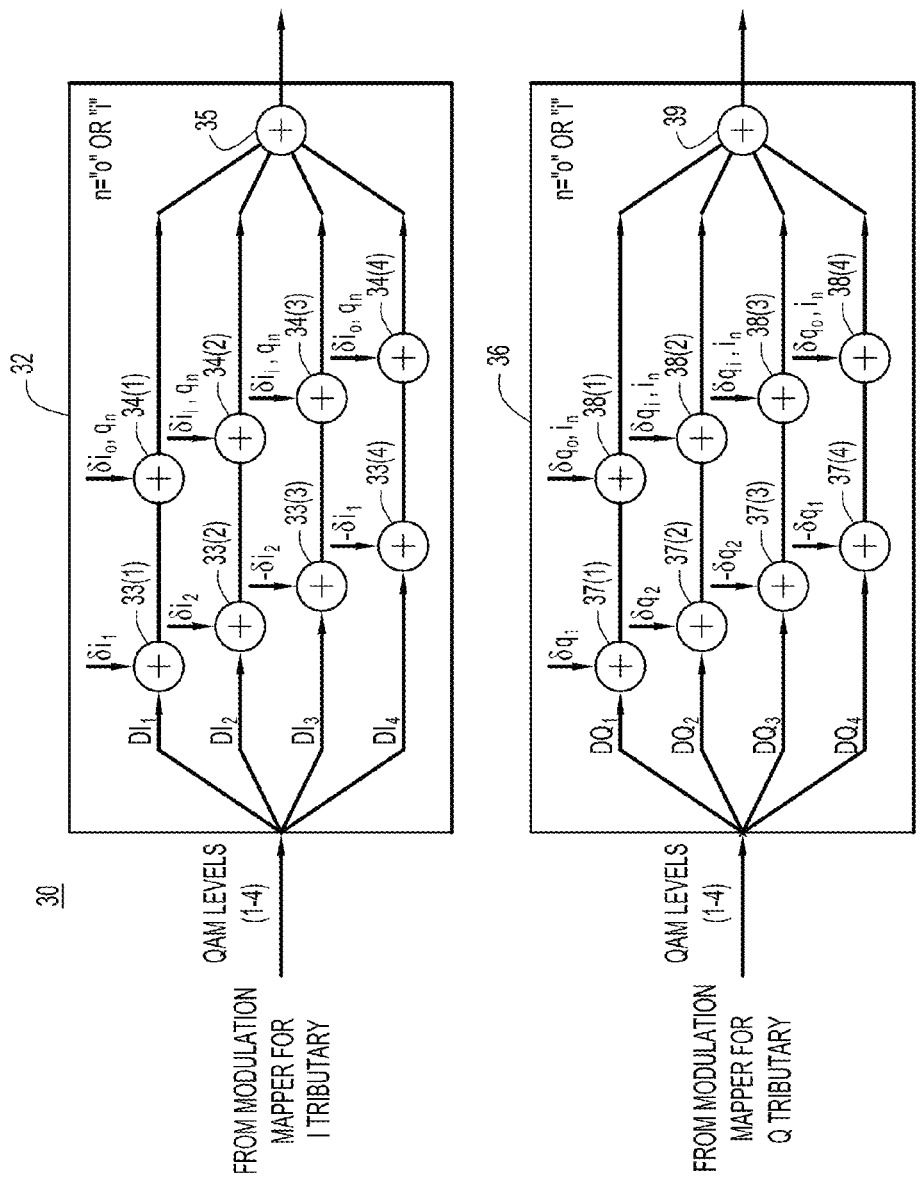

Turning now to FIGS. 13 and 14, examples are shown of digital logic circuitry configured to perform the modulation level adjustments to compensate for the finite ER and inequality in electro-optic efficiency giving rise to the imperfect MZ modulator performance. FIG. 13 is similar to FIG. 6 in that the finite ER and unequal electro-optic efficiency compensation block 30 comprises digital logic circuitry for each of the I and Q tributaries. The circuitry for only one polarization is shown in FIGS. 13 and 14.

There is a circuit 32 for the I tributary and a circuit 36 for the Q tributary. Circuit 32 comprises a first plurality of adders 33(1)-33(4), a second plurality of adders 34(1)-34(4) and an adder 35. The first plurality of adders 33(1)-33(4) are for adjustment of the modulation levels of the standalone I MZ modulator itself. The adjustment values $\delta i_1$, $\delta i_2$, $-\delta i_1$, and $-\delta i_2$, are the adjustment values for the I modulation levels $DI_1$, $DI_2$, $DI_3$ and $DI_4$, respectively. The second plurality of adders 34(1)-34(4) are for adjustments to the I modulation levels based on imperfect performance of the Q MZ modulator, and optionally on the I modulation levels themselves and on the imperfect performance of the I modulator. The adjustments values $\delta i_1,q_n$, $\delta i_2,q_n$, $\delta i_3,q_n$, and $\delta i_4,q_n$, for n=1 to 4, are the adjustment values to the I modulation levels to compensate for imperfect performance of Q MZ modulator, and optionally higher (second and third) order corrections as described above.

An example of a LUT for the adjustment values to the I modulation levels to compensate for the imperfect performance of the Q MZ modulator is:

| 'I' level | 'Q' level | | | |
|---|---|---|---|---|
| | $DQ_1$ | $DQ_2$ | $DQ_3$ | $DQ_4$ |
| $DI_1$ | $\delta i_1, q_1$ | $\delta i_1, q_2$ | $\delta i_1, q_3$ | $\delta i_1, q_4$ |
| $DI_2$ | $\delta i_2, q_1$ | $\delta i_2, q_2$ | $\delta i_2, q_3$ | $\delta i_2, q_4$ |
| $DI_3$ | $\delta i_3, q_1$ | $\delta i_3, q_2$ | $\delta i_3, q_3$ | $\delta i_3, q_4$ |
| $DI_4$ | $\delta i_4, q_1$ | $\delta i_4, q_2$ | $\delta i_4, q_3$ | $\delta i_4, q_4$ |

For example, to adjust the I modulation level $DI_1$, one of the adjustment values $\delta i_1,q_1$, $\delta i_1,q_2$, $\delta i_1,q_3$ or $\delta i_1,q_4$ is used depending on what level the Q MZ modulator is currently transmitting ($DQ_1$, $DQ_2$, $DQ_3$, or $DQ_4$). The same applies for the other I modulation levels.

Circuit 36 is similar to circuit 32. Circuit 36 comprises a first plurality of adders 37(1)-37(4), a second plurality of adders 38(1)-38(4) and an adder 39. The first plurality of adders 37(1)-37(4) are provided to adjust for modulation levels of the standalone Q modulator itself, and the second plurality of adders 38(1)-38(4) are for adjustments to the Q modulation levels based on imperfect performance of the I MZ modulator, and optionally the Q levels themselves and the imperfect performance of the Q modulator. The adjustment values $\delta q_1$, $\delta q_2$, $-\delta q_1$, and $-\delta q_2$, are the adjustment values for the Q modulation levels $DQ_1$, $DQ_2$, $DQ_3$ and $DQ_4$, respectively. The adjustments values $\delta q_1,i_n$, $\delta q_2,i_n$, $\delta q_3,i_n$, and $\delta q_4$, $i_n$, for n=1 to 4, are the adjustment values to the Q modulation levels to compensate for imperfect performance of I MZ modulator, and optionally higher (second and third) order corrections as described above. For example, to adjust the Q modulation level $DQ_1$, one of the adjustment values $\delta q_1,i_1$, $\delta q_1,i_2$, $\delta q_1,i_3$ or $\delta q_1,i_4$ is used depending on what level the I MZ modulator is currently transmitting ($DI_1$, $DI_2$, $DI_3$, or $DI_4$). The same applies for the other I modulation levels.

An example of a LUT for the adjustment values to the Q modulation levels to compensate for the imperfect performance of the I MZ modulator is:

| 'Q' level | 'I' level | | | |
|---|---|---|---|---|
| | $DI_1$ | $DI_2$ | $DI_3$ | $DI_4$ |
| $DQ_1$ | $\delta q_1, i_1$ | $\delta q_1, i_2$ | $\delta q_1, i_3$ | $\delta q_1, i_4$ |
| $DQ_2$ | $\delta q_2, i_1$ | $\delta q_2, i_2$ | $\delta q_2, i_3$ | $\delta q_2, i_4$ |
| $DQ_3$ | $\delta q_3, i_1$ | $\delta q_3, i_2$ | $\delta q_3, i_3$ | $\delta q_3, i_4$ |
| $DQ_4$ | $\delta q_4, i_1$ | $\delta q_4, i_2$ | $\delta q_4, i_3$ | $\delta q_4, i_4$ |

In the general case, there are 16 different entries each in a LUT. These entries are estimated from measurements on the I and Q MZ modulators. As a result of symmetries however, it is possible to simplify the LUTs.

The performance of the I and Q optical modulators may be measured in a variety of ways. For example, the constellation at the output of the transmitter 10 may be measured, and the corrections required from the misplacement of each constellation point then estimated as an indication of the performance of the modulator. If required, the effect of these corrections themselves could be measured, and refinements made to the corrections. Alternatively, measurements could be performed on individual modulators prior to their incorporation within a transmitter module.

FIG. 14 is a diagram similar to FIG. 13, but showing a more simplified arrangement. The adjustments to the I modulation levels to compensate for the imperfect performance of the Q MZ modulator, and vice versa, depend on whether the respective I and Q levels are inner levels (2 or 3) labelled 'i', or outer levels (1 or 4) labelled 'o'. This reduces the number of different entries in each LUT to 4.

For the simplified arrangement of FIG. 14, adjustments to I modulation levels to compensate for imperfect performance of the Q MZ modulator are:

| 'I' level | 'Q' level | | | |
|---|---|---|---|---|
| | $DQ_1$ | $DQ_2$ | $DQ_3$ | $DQ_4$ |
| $DI_1$ | $\delta i_o, q_o$ | $\delta i_o, q_i$ | $\delta i_o, q_i$ | $\delta i_o, q_o$ |
| $DI_2$ | $\delta i_i, q_o$ | $\delta i_i, q_i$ | $\delta i_i, q_i$ | $\delta i_i, q_o$ |
| $DI_3$ | $\delta i_i, q_o$ | $\delta i_i, q_i$ | $\delta i_i, q_i$ | $\delta i_i, q_o$ |
| $DI_4$ | $\delta i_o, q_o$ | $\delta i_o, q_i$ | $\delta i_o, q_i$ | $\delta i_o, q_o$ |

Adjustments to Q modulation levels to compensate for imperfect performance of the I MZ modulator are:

| 'Q' level | 'I' level | | | |
|---|---|---|---|---|
| | $DI_1$ | $DI_2$ | $DI_3$ | $DI_4$ |
| $DQ_1$ | $\delta q_o, i_o$ | $\delta q_o, i_i$ | $\delta q_o, i_i$ | $\delta q_o, i_o$ |
| $DQ_2$ | $\delta q_i, i_o$ | $\delta q_i, i_i$ | $\delta q_i, i_i$ | $\delta q_i, i_o$ |
| $DQ_3$ | $\delta q_i, i_o$ | $\delta q_i, i_i$ | $\delta q_i, i_i$ | $\delta q_i, i_o$ |
| $DQ_4$ | $\delta q_o, i_o$ | $\delta q_o, i_i$ | $\delta q_o, i_i$ | $\delta q_o, i_o$ |

As a result of symmetries, only 4 parameters are needed to be estimated from the measurements on the I and Q MZ modulators for each LUT. The LUT for adjustments to the I modulation levels to compensate for imperfect performance of the Q MZ modulator are:

| 'I' level | 'Q' level | |
|---|---|---|
| | $DQ_o$ | $DQ_i$ |
| $DI_o$ | $\delta i_o, q_o$ | $\delta i_o, q_i$ |
| $DI_i$ | $\delta i_i, q_o$ | $\delta i_i, q_i$ |

The LUT for adjustments to the Q modulation levels to compensate for imperfect performance of the I MZ modulator are:

| 'Q' level | 'I' level | |
|---|---|---|
| | $DI_o$ | $DI_i$ |
| $DQ_o$ | $\delta q_o, i_o$ | $\delta q_o, i_i$ |
| $DQ_i$ | $\delta q_i, i_o$ | $\delta q_i, i_i$ |

The simplified LUTs above show that the circuitry of the compensation block 30 is configured to adjust an I modulation level depending on whether the I modulation level is an outer or inner level and whether a current Q modulation level is an outer level or an inner level, and to adjust a Q modulation level depending on whether the Q modulation level is an outer or inner level and whether a current I modulation level is an outer level or an inner level. For example, the adjustment for an outer I modulation level, $DI_o$, is $\delta i_o, q_o$ when the current Q modulation level is an outer level $DQ_o$ and is $\delta i_o, q_i$ when the current Q modulation level is an inner level $DQ_i$. Similarly, the adjustment for an inner modulation level, $DI_i$ is $\delta i_i, q_o$ when the current Q modulation level is an outer level $DQ_o$, and is $\delta i_i, q_i$ when the current Q modulation is an inner level $DQ_i$. A similar relationship holds true for the adjustments to the Q modulation levels.

Thus, as described herein, according to a first aspect, techniques are provided to optimize an MZ modulator drive waveform by distorting the outer modulation levels, thereby equalizing the eye openings of the received optical field, and in particular creating a wider and more defined central eye opening of the received optical field. The inner modulation levels can also be distorted (to a lesser degree) in order to minimize the BER at the receiver or to minimize the required OSNR for a certain BER. According to a second aspect, techniques are provided to adjust the I modulation levels based on the performance of the Q modulator, and conversely to adjust the Q modulation levels based on the performance of the I modulator, to account for the cross-coupling nature of the interaction between the optical fields produced by an imperfect I MZ modulator and an imperfect Q MZ modulator in a QAM system.

The above description is intended by way of example only. What is claimed is:

1. A method comprising:
   receiving as input, data to be transmitted from a transmitter to a receiver over an optical fiber in a coherent optical communications system;
   converting the data to sequences of one of at least four levels according to a multilevel quadrature amplitude modulation (QAM) scheme, the levels including two outer levels and two or more inner levels;
   distorting only the two outer levels to reduce amplitudes of the two outer levels; and
   driving an optical modulator with the at least four levels after distorting only the two outer levels so that, as a result of the distorting of the at least two outer levels, eye openings of a received optical field at the receiver are equalized.

2. The method of claim 1, wherein driving comprises converting the four or more levels to a voltage drive waveform to drive the optical modulator.

3. The method of claim 2, wherein driving comprises converting the four or more levels to voltages of the voltage drive waveform to drive a Mach-Zehnder optical modulator.

4. The method of claim 1, wherein distorting comprises reducing the two outer levels between approximately 10%-20%.

5. The method of claim 1, wherein converting the data to sequences of four or more levels comprises converting the data to four or more levels according to an 8 QAM or higher modulation scheme.

6. A method comprising:
   receiving as input, data to be transmitted from a transmitter to a receiver over an optical fiber in a coherent optical communications system;
   converting the data to sequences of one of at least four levels according to a multilevel quadrature amplitude modulation (QAM) scheme, the levels including two outer levels and two or more inner levels, wherein converting the data to sequences of four or more levels comprises generating sequences of in-phase (I) modulation levels and sequences of quadrature-phase (Q) modulation levels;
   adjusting the Q modulation levels to compensate for a non-ideal phase response of a first optical modulator based on the I modulation levels;
   adjusting the I modulation levels to compensate for a non-ideal phase response of a second optical modulator based on the Q modulation levels; and
   driving the first optical modulator with adjusted I modulation levels and driving the second optical modulator with adjusted Q modulation levels.

7. The method of claim 6, wherein adjusting the Q modulation levels supplied to the second optical modulator is based on pre-adjusted values of the Q modulation levels, and adjusting the I modulation levels supplied to the first optical modulator is based on pre-adjusted values of the I modulation levels.

8. The method of claim 7, wherein adjusting the Q modulation levels is based further on imperfect performance of the second optical modulator, and adjusting the I modulation levels is based further on imperfect performance of the first optical modulator.

9. The method of claim 8, and further comprising storing compensation values for the first and second optical modulators based on the finite extinction ratio and electro-optic efficiency imbalance determined for the first and second optical modulators, and wherein adjusting the I modulation levels and adjusting the Q modulation levels are based on the stored compensation values.

10. The method of claim 9, wherein adjusting the I modulation levels comprises adjusting an I modulation level depending on whether the I modulation level is an outer or inner level and whether a current Q modulation level is an outer level or an inner level, and wherein adjusting the Q modulation levels comprises adjusting a Q modulation level depending on whether the Q modulation level is an outer or inner level and whether a current I modulation level is an outer level or an inner level.

11. An apparatus comprising:
    a modulation mapper circuit configured to convert transmit data to sequences of one of four or more levels according to a multilevel quadrature amplitude modulation (QAM) scheme, the four or more levels including two outer levels and two or more inner levels;
    a distortion circuit configured to distort only the two outer levels to reduce amplitudes of the two outer levels;
    a modulator driver circuit configured to generate a modulator drive waveform from the output of the distortion circuit and the modulation mapper circuit; and
    an optical modulator configured to receive as input the modulator drive waveform and to modulate a light beam for transmission from a transmitter to a receiver over an optical fiber in a coherent optical communications system, so that, as a result of the distorting only the two outer levels, eye openings of a received optical field at the receiver are equalized.

12. The apparatus of claim 11, wherein the optical modulator is a Mach-Zehnder optical modulator.

13. The apparatus of claim 11, wherein the distortion circuit is configured to distort the outer two levels between approximately 10% and 20%.

14. The apparatus of claim 11, wherein the distortion circuit comprises digital logic circuitry comprising a plurality of adders, each of which is configured to receive as input a corresponding one of the levels and a corresponding distortion value.

15. An apparatus comprising:
    a modulation mapper circuit configured to convert transmit data to sequences of one of four or more levels according to a multilevel quadrature amplitude modulation (QAM) scheme, the four or more levels including two outer levels and two or more inner levels, wherein the modulator mapper circuit is configured to generate sequences of in-phase (I) modulation levels and sequences of quadrature-phase (Q) modulation levels;

a first optical modulator and a second optical modulator;

a compensation circuit configured to adjust the Q modulation levels to compensate for a non-ideal phase response of the first optical modulator based on the I modulation levels to produce adjusted Q modulation levels and to adjust the I modulation levels to compensate for a non-ideal phase response of the second optical modulator based on the Q modulation levels to produce adjusted I modulation levels; and wherein the first optical modulator is driven on the basis of the adjusted I modulation levels and the second optical modulator is driven on the basis of the adjusted Q modulation levels.

16. The apparatus of claim 15, and further comprising a memory configured to store compensation values for the first and second optical modulators based on the finite extinction ratio and electro-optic efficiency imbalance determined for the first and second optical modulators, and wherein the compensation circuit is configured to adjust the I modulation levels and the Q modulation levels based on the stored compensation values.

17. The apparatus of claim 15, wherein the compensation circuit is configured to adjust the Q modulation levels based on imperfect performance of the first modulator, and to adjust the I modulation levels based on imperfect performance of the second modulator.

18. The apparatus of claim 15, wherein the compensation circuit is further configured to adjust the Q modulation levels supplied to the second optical modulator based on pre-adjusted values of the Q modulation levels and to adjust the I modulation levels supplied to the first optical modulator based on pre-adjusted values of the I modulation levels.

19. The apparatus of claim 18, wherein the compensation circuit is configured to adjust an I modulation level depending on whether the I modulation level is an outer or inner level and whether a current Q modulation level is an outer level or an inner level, and to adjust a Q modulation level depending on whether the Q modulation level is an outer or inner level and whether a current I modulation level is an outer level or an inner level.

20. One or more tangible computer readable storage media encoded with instructions that, when executed by a processor, cause the processor to:

receive as input, data to be transmitted over an optical fiber from a transmitter to a receiver in a coherent optical communications system;

convert the data to sequences of one of at least four levels according to a multilevel quadrature amplitude modulation (QAM) scheme, the levels including two outer levels and two or more inner levels;

distort only the two outer levels to reduce amplitudes of the two outer levels; and supply the at least four levels, after distorting the two outer levels, to drive an optical modulator so that, as a result of the distorting of the at least two outer levels, eye openings of a received optical field at the receiver are equalized.

21. The computer readable storage media of claim 20, wherein the instructions that cause the processor to convert the data to sequences of four or more levels comprises generating sequences of in-phase (I) modulation levels and sequences of quadrature-phase (Q) modulation levels; and further comprising instructions that cause the processor to:

adjust the Q modulation levels to compensate for a non-ideal phase response of a first optical modulator; and adjust the I modulation levels to compensate for a non-ideal phase response of a second optical.

22. The tangible computer readable storage media of claim 20, wherein the instructions operable to convert comprise instructions operable to convert the four or more levels to voltages of the voltage drive waveform configured to drive a Mach-Zehnder optical modulator.

23. A tangible computer readable storage media encoded with instructions that, when executed by a processor, cause the processor to:

obtain as input, data to be transmitted over an optical fiber from a transmitter to a receiver in a coherent optical communications system;

convert the data to sequences of one of at least four levels according to a multilevel quadrature amplitude modulation (QAM) scheme, the levels including two outer levels and two or more inner levels, the sequences including sequences of in-phase (I) modulation levels and sequences of quadrature-phase (Q) modulation levels;

adjust the Q modulation levels to compensate for a non-ideal phase response of a first optical modulator based on the I modulation levels;

adjust the I modulation levels to compensate for a non-ideal phase response of a second optical modulator based on the Q modulation levels; and drive the first optical modulator on the basis of the adjusted I modulation levels and drive the second optical modulator on the basis of the adjusted Q modulation levels.

24. The tangible computer readable storage media of claim 23, wherein the instructions operable to adjust comprise instructions operable to adjust the Q modulation levels supplied to the second optical modulator based on pre-adjusted values of the Q modulation levels, and adjust the I modulation levels supplied to the first optical modulator based on pre-adjusted values of the I modulation levels.

25. The tangible computer readable storage media of claim 24, wherein the instructions operable to adjust comprise instructions operable to adjust the Q modulation levels based further on imperfect performance of the second optical modulator, and adjust the I modulation levels is based further on imperfect performance of the first optical modulator.

26. The tangible computer readable storage media of claim 24, wherein the instructions operable to adjust comprise instructions operable to adjust I modulation levels depending on whether an I modulation level is an outer or inner level and whether a current Q modulation level is an outer level or an inner level, and to adjust the Q modulation levels depending on whether an Q modulation level is an outer or inner level and whether a current I modulation level is an outer level or an inner level.

27. The tangible computer readable storage media of claim 23, further comprising instructions operable to store compensation values for the first and second optical modulators based on the finite extinction ratio and electro-optic efficiency imbalance determined for the first and second optical modulators, and wherein the instructions operable to adjust comprise instructions operable to adjust the I modulation levels and adjust the Q modulation levels based on the stored compensation values.

* * * * *